Dec. 5, 1967  D. M. SCRUGGS  3,356,867
THERMAL AND ELECTRICAL INSULATING MEANS
Filed Oct. 25, 1963
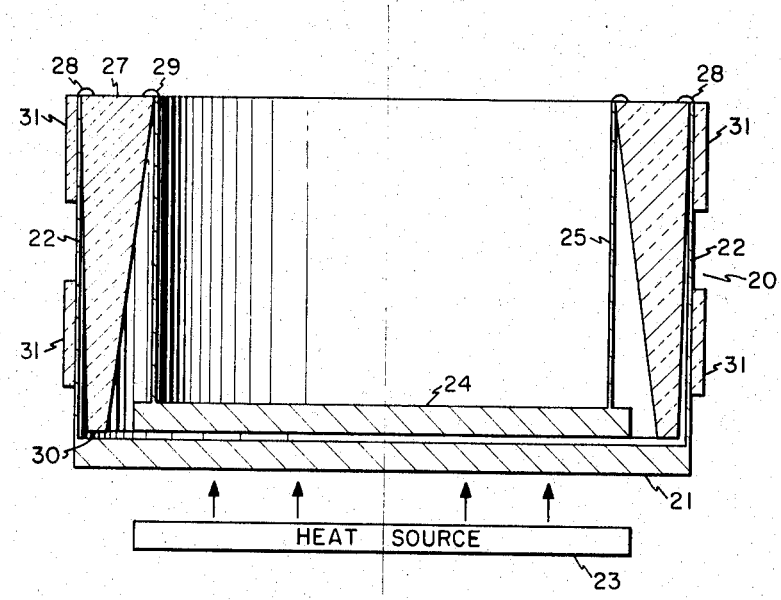
INVENTOR.
DAVID M. SCRUGGS
BY
*Richard J. Seeger*
ATTORNEY

United States Patent Office 3,356,867
Patented Dec. 5, 1967

3,356,867
THERMAL AND ELECTRICAL INSULATING MEANS
David M. Scruggs, Ann Arbor, Mich., assignor to The Bendix Corporation, Southfield, Mich., a corporation of Delaware
Filed Oct. 25, 1963, Ser. No. 318,986
1 Claim. (Cl. 310—4)

This invention pertains to thermal and electrical insulating means and more particularly to means for insulating the low temperature anode from the very high temperature cathode in a thermionic converter.

In a thermionic converter, the insulation requirements are severe since a cathode material is heated to the point where electrons are "boiled off" the cathode and these electrons pass to a relatively low temperature anode material where they are "condensed" to provide an electrical current flow.

In applications such as thermionic converters, the manner in which the heated area is insulated from the low temperature area is very important. This is because the manner in which the insulation is attached to the heated area limits the amount of heat that may be applied to the heated area and therefore limits the total efficiency of the converter. Another reason affecting the efficiency is that the insulating material in prior devices had a large area contact with the heated cathode and this resulted in a substantially large heat loss due to heat flow through the insulating material. Further, the manner in which the insulation was sealed to the cathode was limited in prior devices since the seal had to be sufficiently strong to withstand thermal expansion of the cathode.

This invention increases the efficiency of thermionic converters by providing insulation between the heated cathode and the low temperature anode which (1) does not come in direct contact with the cathode at operating temperatures, (2) removes the insulation seals from the heated area, and (3) removes the stresses from the seals caused by thermal expansion of the cathode.

Briefly, these objects are obtained by attaching a cylindrical thin metal foil to the circumference of each of the cathode and anode and then placing a ceramic member between the two foils and sealing the ceramic to the free ends of the two foils. Since the free ends of the foils are removed from the heated cathode, the seals are not subjected to the high temperatures. Further, the foil walls are sufficiently flexible to allow for thermal expansion of the cathode. The ceramic insulator between the two foils extends to and touches the cathode when the device is inoperative and is at low temperatures thereby forming a support at low temperatures.

These and other objects and advantages will become more apparent when a preferred embodiment is considered in connection with the figure in the drawing which shows a cross section view of a preferred embodiment.

In the preferred embodiment shown in the drawing is a cathode 21 which is in the shape of a circular disc and which may be of a material such as molybdenum, tungsten or tantalum. A thin foil wall 22 which may be .0001 inch in thickness extends laterally or transversely from cathode 21 and is securely fixed to the circumference of cathode 21. Preferably, the foil 22 is of the same material as cathode 21 and is integral with cathode 21 so that no mechanical seal need be made at the circumference of cathode 21 with foil 22.

Placed inside the "cup" formed by cathode 21 and foil 22 is an anode disc 24 which is circular in configuration and which may be of similar material to cathode 21. Disc 24 also has a foil wall 25 extending transversely thereto and secured to its circumference.

Between foil walls 22 and 25 is a ceramic wall 27 which is tapered at its lower end. The upper end of ceramic wall 27, which may be of alumina, yttria, zirconia, or hafnia, is sealed to foil wall 22 at seal 28 and sealed to foil wall 25 at seal 29. The seals 28 and 29 may be made by brazing.

The ceramic insulating wall 27 extends from the seals 28 and 29 to cathode disc 21. When the thermionic converter is inoperative and disc 21 is cooled at a low temperature, the end 30 of wall 27 will be touching the disc 21 and therefore act as a support for foils 22 and 25. However, when disc 21 is heated to operating temperature, as by heat source 23, the foil walls 22 and 25 will expand thereby providing a clearance between the end 30 and the disc 21.

The clearance between end 30 and disc 21, as will be appreciated by those skilled in the art, provides a very large temperature gradiant resulting in end 30 being at a substantially lower temperature than cathode 21. Since end 30 is also very thin in the radial direction, the heat loss through insulator 27 is very small especially when compared to the heat loss of the devices of the prior art.

The heat loss occurring through foil 22 is also very small, even though the foil is of metallic construction, due to its extreme thinness. Hence overall there is at least 50 percent less heat loss through the device of this invention than devices of the prior art thereby correspondingly increasing the efficiency of the thermionic converter 20.

Another advantage of this invention is that when cathode 21 is heated to its operating temperature, such as 2,000 degrees centigrade, the thermal expansion of disc 21 will merely cause a bending of foil 22 and will put very little stress on seals 28 and 29. In prior art devices the insulator was placed directly between the anode and the cathode and very large stresses were placed on the seals due to thermal expansion. Also, since less stress is placed on the seals, they need not be as large or as strong as in previous devices making the converter less expensive and enabling a much larger variety of seals to be used.

Further, since the seals 28 and 29 are far removed from the heated cathode 21, they are less likely to become destroyed by the heat of cathode 21 and hence cathode 21 may operate at a higher temperature. A temperature increase of 100 percent is possible and, as those skilled in the art will appreciate, this will correspondingly increase the efficiency of the thermionic converter.

Spacers 31 are made of a temperature and electrical insulator material, which may be similar to the ceramic for wall 27, and are attached to the outer walls of foil 22 so that many converters can be used together and yet be insulated one from another.

Although this invention has been disclosed and illustrated with reference to particular applications, the principles involved are susceptible of numerous other applications which will be apparent to persons skilled in the art. The invention is, therefore, to be limited only as indicated by the scope of the appended claim.

Having thus described my invention, I claim:

A thermionic converter wherein heat is applied to a cathode causing electron flow to an anode comprising
an anode,
a cathode substantially parallel to said anode with one side of said cathode being spaced closely to said anode,
the other side of said cathode being adapted to receive heat from a heat source,
first foil walls being attached at one end to the anode and having the free end of the foil walls extending in a direction away from the heat source so that it is in a relatively unheated area, second foil walls being attached at one end to said cathode and having the free end of the second foil walls extending in a direction away from the heat source to said relatively unheated area, electrical and thermal insulating means being between the first and second foil walls, said free ends in said relatively unheated area being sealed at a point in said relatively unheated area so that the seal is not subject to the intense heat of the source thereby minimizing seal requirements, said foil walls being substantially thinner than said anode and cathode thereby conducting less heat and experiencing a lower heat loss and also being capable of substantial strain during thermal expansion of the materials of the converter thereby relieving stress on the seals and members of the converter, said insulating means being of a relatively rigid material, said insulating means extending towards but spaced a predetermined distance from said cathode when said cathode is at its operating temperatures, said insulating means forming a physical contact with said cathode during lower temperatures thereby forming a physical support for said foil means, prolonging the life of said foil means.

References Cited

UNITED STATES PATENTS

| | | | |
|---|---|---|---|
| 3,079,515 | 2/1963 | Saldi | 310—4 |
| 3,139,542 | 6/1964 | Huber | 310—4 |
| 3,187,205 | 6/1965 | Martini | 310—5 |
| 3,223,858 | 12/1965 | Martini | 310—4 |
| 3,243,612 | 3/1966 | Lyczko | 310—4 |

MILTON O. HIRSHFIELD, *Primary Examiner.*

J. W. GIBBS, D. F. DUGGAN, *Assistant Examiners.*